US006863244B2

(12) United States Patent
Fowell et al.

(10) Patent No.: US 6,863,244 B2
(45) Date of Patent: Mar. 8, 2005

(54) MITIGATION OF ANGULAR ACCELERATION EFFECTS ON OPTICAL SENSOR DATA

(75) Inventors: Richard A. Fowell, Rolling Hills Estates, CA (US); Salma I. Saeed, Menlo Park, CA (US); Rongsheng Li, Hacienda Heights, CA (US); Yeong-Wei Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/360,020

(22) Filed: Feb. 7, 2003

(65) Prior Publication Data

US 2004/0148068 A1 Jul. 29, 2004

Related U.S. Application Data

(60) Provisional application No. 60/442,493, filed on Jan. 24, 2003.

(51) Int. Cl.[7] ................................................ B64G 1/24
(52) U.S. Cl. ..................... 244/171; 244/3.15; 244/3.16; 244/3.18; 244/3.21; 244/158 R; 244/164; 701/3; 701/4; 701/13; 701/207; 701/222
(58) Field of Search ............................... 244/3.1, 3.15, 244/3.16–3.22, 158 R, 164, 171; 701/200, 207, 222, 300

(56) References Cited

U.S. PATENT DOCUMENTS

| 3,952,151 | A | | 4/1976 | Jenkin |
| 5,660,355 | A | * | 8/1997 | Waymeyer ................. 244/3.15 |
| 6,179,246 | B1 | * | 1/2001 | Fisel et al. ................. 244/3.16 |
| 6,285,927 | B1 | | 9/2001 | Li et al. |

OTHER PUBLICATIONS

Edward Wong et al., "Post–Flight Attitude Reconstruction for the Shuttle Radar Topography Mission", American Astronomical Society, AAS 01–314, pp. 213–233, 2001.

* cited by examiner

*Primary Examiner*—Bernarr E. Gregory
(74) *Attorney, Agent, or Firm*—Gates & Cooper LLP (57) ABSTRACT

A method, apparatus, article of manufacture, and a memory structure for compensating for optical sensor data corrupted by angular acceleration is disclosed. The method comprises the steps of determining an angular acceleration of the optical sensor and modifying the optical sensor data according to the determined angular acceleration of the optical sensor. The apparatus comprises a sensor for determining an angular acceleration of the optical sensor and a navigation system for modifying the optical sensor data according to the determined angular acceleration of the optical sensor.

48 Claims, 7 Drawing Sheets

MITIGATION OF ANGULAR ACCELERATION EFFECTS ON OPTICAL SENSOR DATA

CROSS-REFERENCE TO RELATED APPLICATIONS

This application claims benefit of U.S. Provisional Patent Application No. 60/442,493, entitled "MITIGATION OF ANGULAR ACCELERATION EFFECTS ON STAR TRACKER DATA," by Richard A. Fowell, Salma I. Saeed, Rongsheng Li, and Yeong-Wei Wu, filed Jan. 24, 2003, which application is hereby incorporated by reference herein.

STATEMENT OF RIGHTS OWNED

This invention was made with U.S. Government support. The Government has certain rights in this invention.

BACKGROUND OF THE INVENTION

1. Field of the Invention

The present invention relates to systems and methods for the guidance and control of vehicles, and in particular to a system and method for mitigating the effect of angular acceleration on optical sensor data.

2. Description of the Related Art

As is described in U.S. Pat. No. 6,285,927, which patent is hereby incorporated by reference, optical sensors such as star trackers are commonly used to assist in the navigation and control of spacecraft. Typically, star trackers report the position of an observed star in a two-dimensional star tracker reference frame, for example, indicating the star position in terms of a horizontal and vertical displacement (H and V, respectively) from the boresight of the star tracker. Such measurements are obtained with charge coupled device (CCD) or similar arrays that collect incident radiation (e.g. photons) over an integration period. The star trackers typically report the centroid of the measurements taken over the integration period and the center time of the integration. Star tracker measurements are sufficiently accurate if the attitude of the spacecraft remains reasonably constant over time, as centroid of the apparent motion of the stars over the integration time will be close to the actual position of the star. Star tracker measurements are also reasonably accurate when the spacecraft experiences a constant angular velocity $\omega$ over the integration time, as the centroid of the apparent motion of the star over the integration time will also be close to the actual position of the star at the center-time of the integration.

However, the measured centroid is shifted from the true position of the star at the center time of the integration when the apparent velocity of stars crossing the star tracker field of view changes during the integration period. Star trackers can meet angular accuracy requirements if the angular acceleration of the star tracker is small (e.g. less than 0.1 deg/sec/sec.), but for accelerations above that, the star tracker data includes a bias error that corrupts the spacecraft attitude estimate.

This problem is especially troublesome for agile spacecraft (spacecraft operating with potentially high angular dynamics) applications, where tight pointing requirements and relatively large angular accelerations are the norm.

What is needed is a system and method for improving the accuracy of optical sensor data. The present invention satisfies that need for a wide variety of vehicles and optical sensors, and is particularly useful for star tracker data used to control agile spacecraft having tight pointing requirements.

SUMMARY OF THE INVENTION

To address the requirements described above, the present invention discloses a method, apparatus, article of manufacture, and a memory structure for compensating for optical sensor data corrupted by angular acceleration. The method comprises the steps of determining an angular acceleration of the optical sensor and modifying the optical sensor data according to the determined angular acceleration of the optical sensor. The apparatus comprises a sensor for determining an angular acceleration of the optical sensor and a navigation system for modifying the optical sensor data according to the determined angular acceleration of the optical sensor.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, byway of illustration, several embodiments of the present invention. It is understood that other embodiments may be utilized and structural changes may be made without departing from the scope of the present invention.

Figure 1:
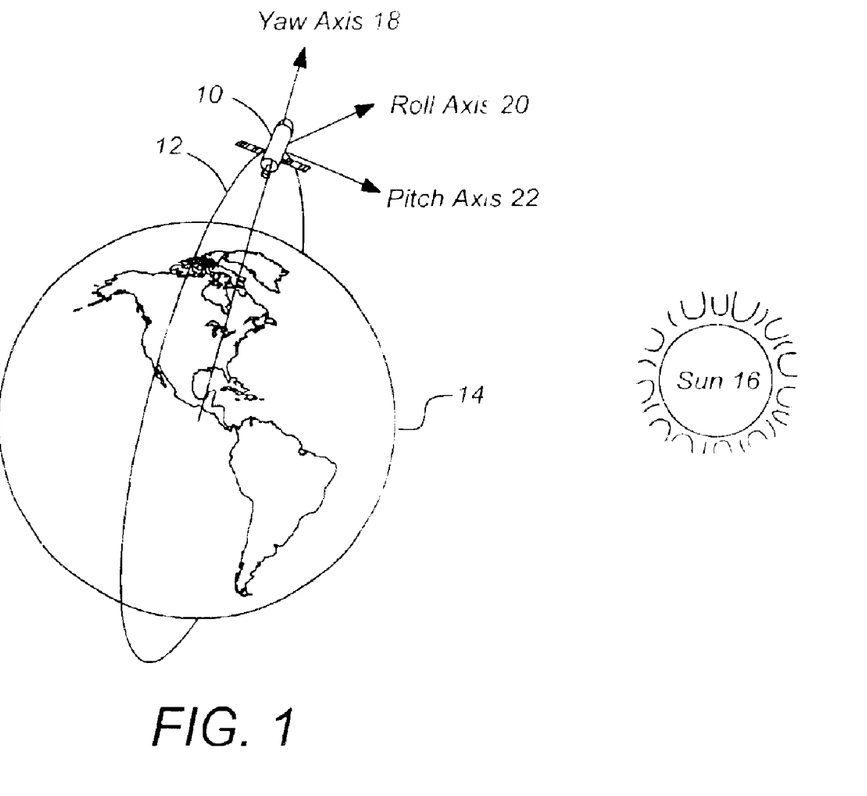
FIG. 1 is a schematic representation of a satellite at an exemplary location relative to the earth and sun.

Referring to FIG. 1, a spacecraft, such as a satellite 10 is shown in orbit 12 around the earth 14. Three mutually orthogonal axes, labeled yaw axis 18, roll axis 20, and pitch axis 22, define a spacecraft frame of reference. The yaw axis 18 is coincident with the bore sight of the satellite 10 pointing toward the earth's center. The roll axis 20 is tangential to the orbit 12 in which the satellite 10 travels, and the pitch axis 22 is orthogonal to the plane of the orbit 12. The illustrated orbit 12 is a sun-synchronous orbit, as is characterized by the line of sight of the satellite 10 to the sun 16 being coincident with the pitch axis 22. Of course, the attitude control method as described herein is not limited to such an orbit and, indeed, is preferably employed in spacecraft programmed to perform dynamic maneuvers.

The satellite 10 includes apparatus (see FIG. 2) for determining its attitude and for correcting its attitude in order to continuously provide accurate pointing. More particularly, attitude refers to the orientation of the satellite 10 with respect to three orthogonal reference axes. The sensed attitude represents satellite angular orientation relative to the spacecraft frame of reference defined by the yaw axis 18, the roll axis 20 and the pitch axis 22. It is generally desirable to know the attitude of the satellite 10 with respect to the orbital frame of reference or an inertial frame of reference by means of a quaternion which embodies the relation between the satellite body frame of reference and the orbital or inertial frame of reference. Thus, as shown in FIG. 1, in the case where the satellite axes 18, 20, 22 are perfectly aligned with the orbital frame of reference, the pitch axis 22 of the satellite 10 experiences the full orbital rate.

Figure 2:
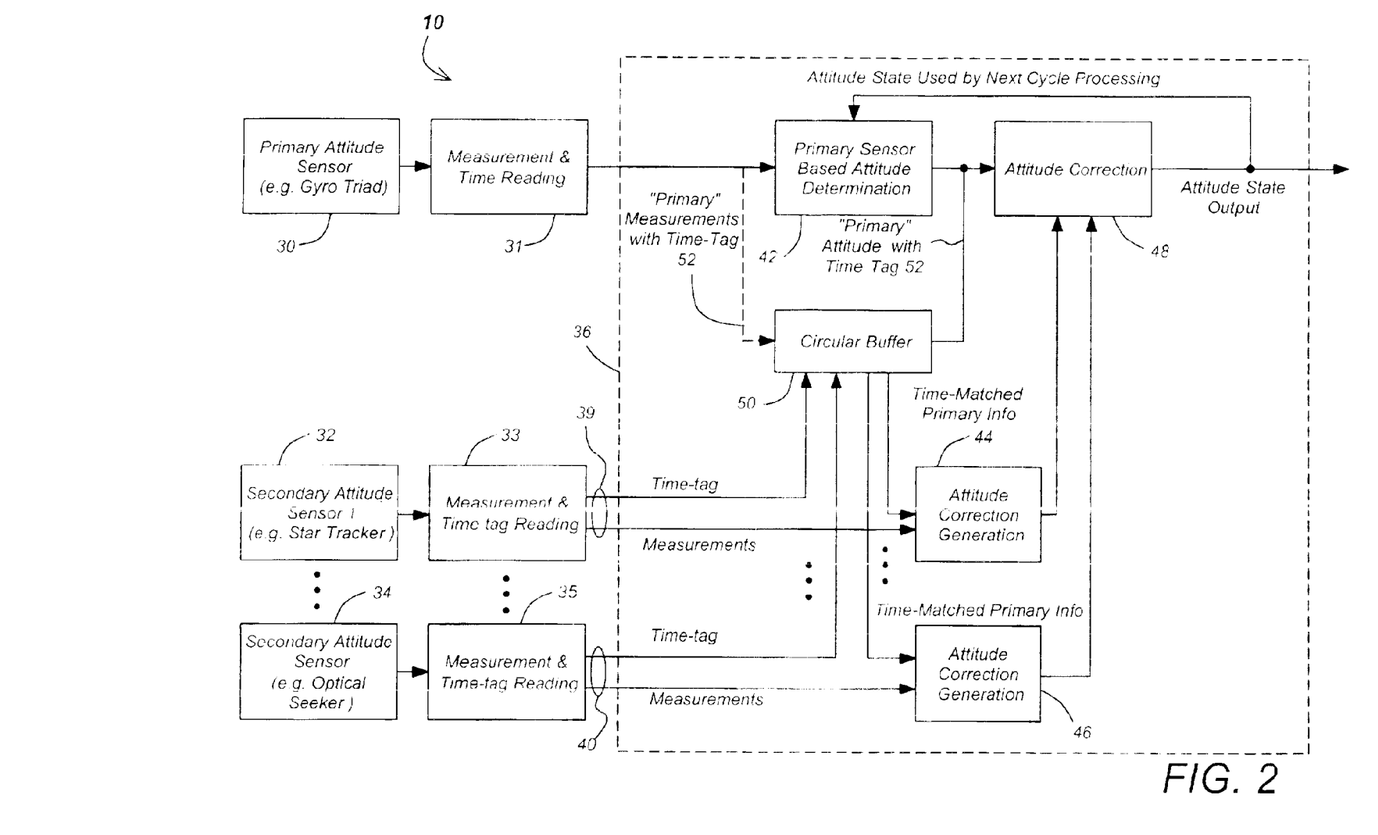
FIG. 2 is a functional block diagram of a spacecraft attitude control system according to one embodiment of the present invention.

FIG. 2 shows, in block diagram form, the primary components of the satellite 10 necessary for attitude processing and control. Satellite 10 includes primary attitude sensor 30 such as a gyroscope (i.e., inertial sensor), one or more secondary sensors 32, 34 such as an earth sensor, a sun sensor, a star tracker, or beacon sensor (i.e., attitude "position" sensors), and a spacecraft control processor (SCP) 36, which implements at least a portion of the spacecraft navigation system.

The primary attitude sensor 30 located on the satellite 10 measures rotational rates experienced by the satellite 10 relative to the spacecraft frame of reference. The primary attitude sensor 30 measures the rotational rates of the satellite 10 with respect to the three mutually orthogonal axes 18, 20, 22 and provides the incremental roil, pitch, and yaw angles computed by integrating the sensed rates.

Similarly, secondary attitude sensors 32 and 34 such as sun sensors, earth sensors, star trackers, and/or beacons provide a reference measurement to the respective sensed source.

In this case, the primary and secondary attitude sensors 30, 32, 34 each have an associated clock and processor 31, 33, 35 which communicates with the spacecraft control processor 36 through an asynchronous bus 38, 39, 40, respectively. Accordingly, each of the primary and secondary attitude sensors 30, 32, 34 provide attitude data having an associated time tag to the satellite control processor 36. The time tags allow time matching of the sensor data to calculate attitude corrections for the spacecraft. To accomplish this, the time tag for each sensor measurement must be referenced with respect to the time reference established for the satellite control processor 36. The time tags are made available from the sensor, or can be constructed based on the sensor operations and sensor interface design. The specific implementation for obtaining a time tag, however, is dependent upon the specific sensors used in the satellite control system.

To provide the most reliable time-matched data, the primary sensor 30 is preferably the sensor which outputs information with the least latency and highest output rate. For example, if a gyroscope triad is used in the system, the gyroscope triad would typically be chosen as the primary sensor 30. Thus, as shown in FIG. 2, the primary attitude sensor 30 is used to generate the attitude state/output, and the secondary attitude sensors 32, 34 are used to generate corrections to the attitude state/output.

In general, the spacecraft control processor 36 is responsible for processing the attitude sensor data to update the spacecraft attitude and thereby maintain the satellite 10 in its desired attitude. The spacecraft control processor may include one or more processors communicatively coupled to one or more associated memory units operating under the control of a system clock. The primary sensor-based attitude determination is processed in block 42 by known methods such as quaternion integration to produce the attitude state/ output of the spacecraft 10. Similarly, attitude correction based upon the secondary sensor attitude data is processed by known methods, such as a Kalman filter, in blocks 44 and 46. Spacecraft attitude correction is processed in block 48 by known methods as a function of the output of blocks 42, 44, and 46. This output is then used to update the spacecraft attitude.

The spacecraft control processor 36 further includes a buffer 50. In one embodiment, the buffer 50 is a circular, or first-in-first-out (FIFO), buffer. The buffer 50 stores attitude information derived from the primary attitude sensor which is received along signal line 54. Alternatively, the buffer 50 can store the primary attitude sensor measurements received along signal line 52. This information is stored together with a time tag associated with the measurement data or the attitude data derived from the primary attitude sensor measurement. For optimum performance, the primary attitude sensor data is stored in the buffer 50 at the maximum possible rate. In the case of a circular buffer, the amount of memory storage should be sufficient to provide data for the maximum delay associated with the secondary attitude sensors 32, 34.

Circular buffer 50 may also store other time-tagged spacecraft dynamic data, such as the angular velocity or acceleration of the spacecraft 10, which may be derived from the primary attitude sensor measurements, from other sensor measurements, or both.

In operation, before the data associated with the secondary attitude sensors 32, 34 can be used to correct the spacecraft attitude in blocks 44, 46 and 48, it must be time-matched to the primary attitude sensor data which is being output at a higher rate. This is accomplished by using the time-tag of the secondary attitude sensor data to look up two or more data values stored in the circular buffer 50 having a time-tag closest in time to the time-tag of the secondary attitude sensor data being used. These retrieved data points are then used to construct a time-matched data point by, for example, interpolation. The time-matched primary attitude sensor data is then used together with the secondary attitude sensor data as shown in blocks 44 and 46 to compute the attitude correction using, for example, Kalman filters. This time-matched attitude correction data is then used to correct the primary attitude state as shown in block 48.

Figure 3:
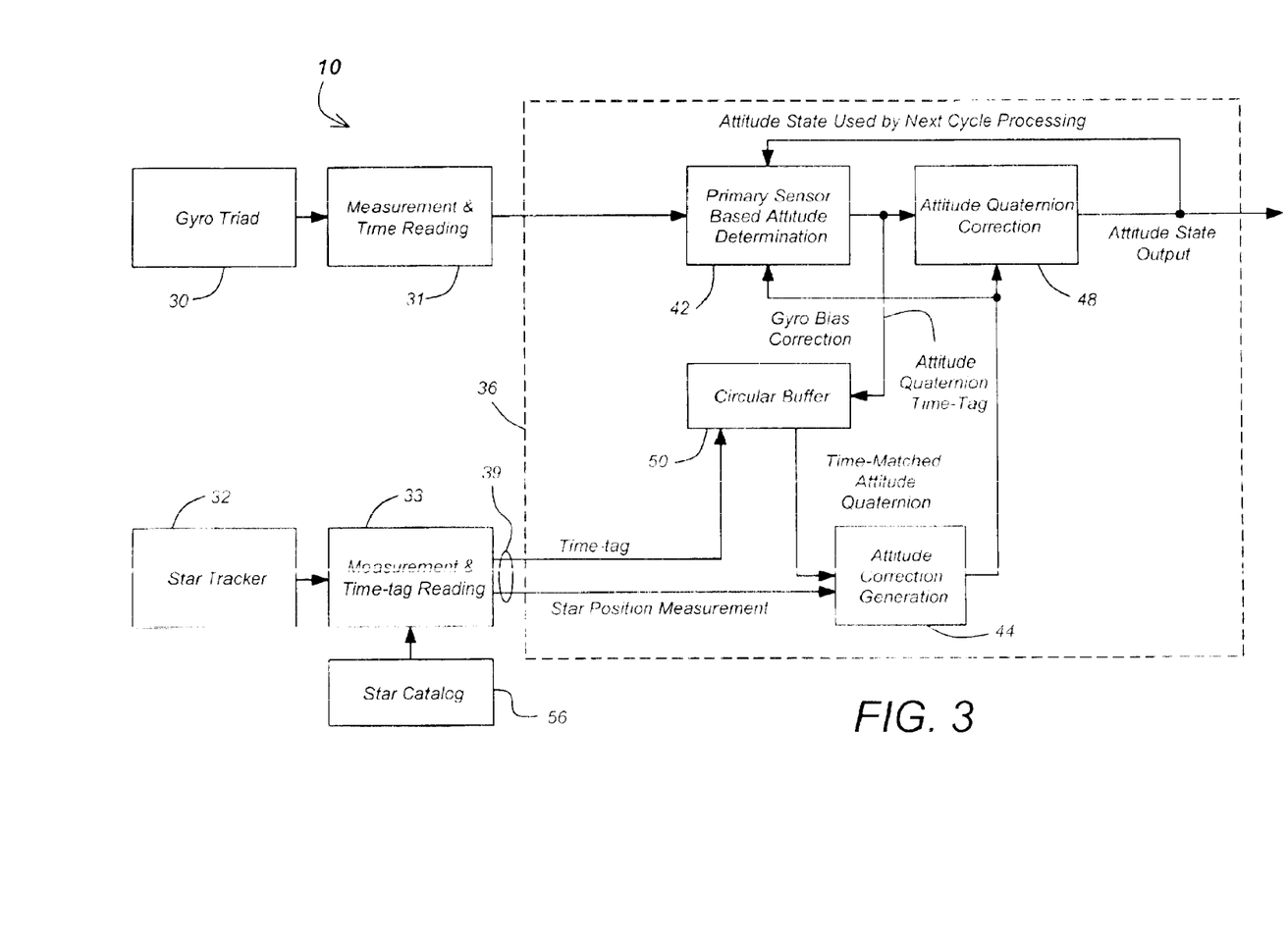
FIG. 3 is a functional block diagram of another embodiment of a spacecraft attitude control system according to the present invention.

FIG. 3 is a block diagram depicting another embodiment of a spacecraft attitude control system. For simplicity, components corresponding to those described with reference to FIG. 2 are given the same reference numeral. For illustrative purposes, however, FIG. 3 is an exemplary specific implementation of the present attitude control system. As shown in FIG. 3, the primary attitude sensor 30 is a gyro triad and only one secondary attitude sensor 32 is provided—a star tracker having an associated star catalog 56. In this case, the primary attitude sensor 30 is a three-axis gyroscope that outputs the three-axis delta angles ($\Delta\theta$) at, for example, 30 Hz. The delta angles together with their associated time-tags are received by the software module 42 which performs quaternion integration at 30 Hz. The quaternion, as a mathematical representation of the spacecraft attitude, together with the time-tag, is stored into the circular buffer 50 along signal line 54 at a rate of 30 Hz.

Figure 4:
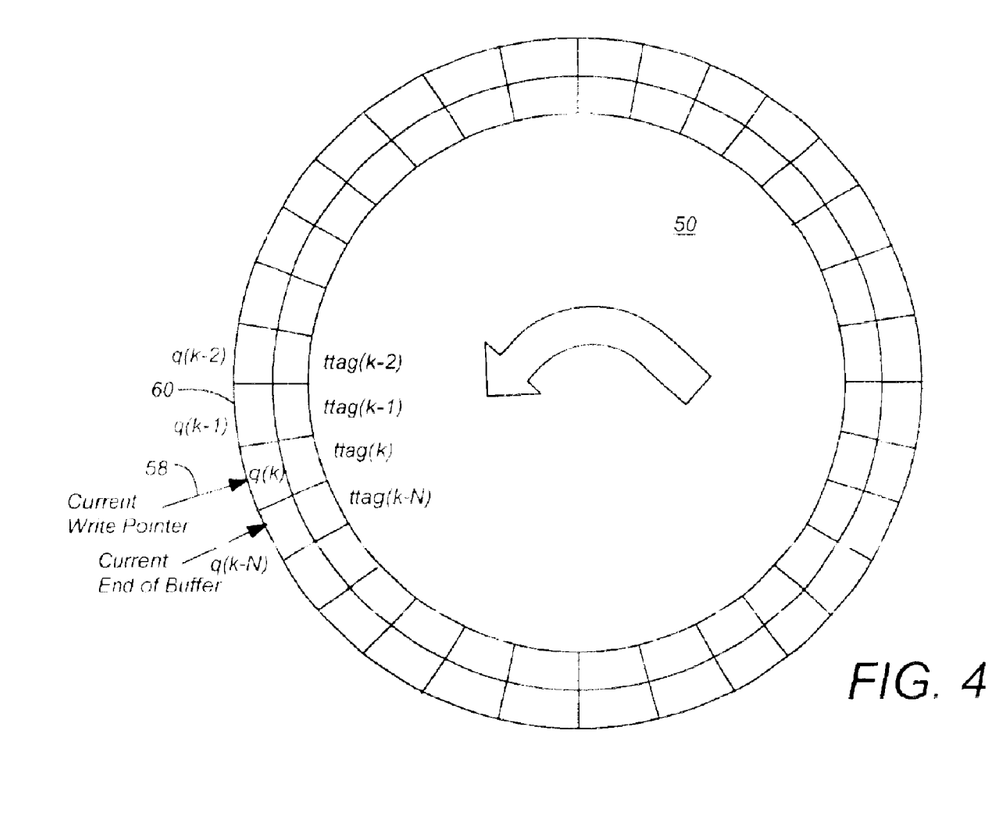
FIG. 4 is a schematic block diagram of a circular buffer for use in connection with the attitude control system of FIG. 3.

FIG. 4 shows one embodiment of the circular buffer 50 of FIG. 3. In this case, the quaternion output, together with its time tag, is stored into the buffer location as pointed to by the current write pointer 58. Once this occurs, the write pointer 58 is indexed to the next data slot 60.

The q(k) and ttag(k) illustrated in FIG. 4 represent the quaternion and the time-tag, respectively, produced by the quaternion integration algorithm (block 42 of FIG. 3) for the current moment. As can be seen, the buffer 50 contains the quaternion and the associated time-tag at time k, k-1, k-2, . . . , k-N. The data point k-1 corresponds to the previous time frame which, in this example, is $\frac{1}{30}^{th}$ of a second earlier than the current time frame t(k), and k-2 represents the data point before k-1 which is $\frac{1}{30}^{th}$ of a second earlier than k-1, and so on. N represents the length of the buffer 50. Preferably, N is sized large enough to store data up to the maximum time-mismatch between the star tracker data and gyro data.

Referring again to FIG. 3, once the star measurement is complete in block 33, the time-tag associated with star tracker measurement is then used to retrieve two quaternions in the buffer 50 having time-tags closest in time to the star measurement time-tag. If the star measurement tune tag is defined as st_ttag, and the indices associated with the two quaternions are given by j and j+1, a time-matched quaternion q(st_ttag), for the current star measurement can be calculated by interpolation as follows:

$$dq = q(j)^{-1} \otimes q(j+1) \quad \text{EQ. (1)}$$

$$Fract = (st\_ttag - ttag(j))/(ttag(j+1) - ttag(j)) \quad \text{EQ. (2)}$$

$$qt(st\_ttag) = q(j) \otimes \left( \frac{(Fract) * dq(1:3)}{\sqrt{1 - Fract^2 * dq(1:3) \cdot dq(1:3)}} \right) \quad \text{EQ. (3)}$$

where $\otimes$ denotes quaternion multiplication, $\bullet$ denotes a vector dot product, dq(1:3) is the vector part (the first three elements) of the quaternion dq, and $q(j)^{-1}$ is the quaternion inverse of q(j).

This simple interpolation assumes that dq represents a small-angle motion, and that the angular velocity is constant over this interval. When these assumptions are inappropriate, the nonlinear nature of dq can be accounted for, as well as the variation of angular velocity (for example, using more quaternion samples and a higher order curve fit).

Given the time-matched quaternion and the star measurements, the attitude and gyro bias corrections can be computed using known methods of direct-match star identification and Kalman filter techniques as shown in block 44. These corrections are then applied to the gyroscope data and attitude quaternion in block 48 before the quaternion integration in block 42 executes its next iteration.

Mitigation of Angular Acceleration Effects on Star Tracker Data

As described above, typical star trackers generate data by integrating the received signals over a significant time (typically 125–250 msec) and report data under the assumption that the centroid of the integrated energy represents the position of the star in the star tracker at the center of the integration time. When the apparent crossing rate of the star in the star tracker field of view is constant over the integration, this is a fair assumption. When the sensor is subject to angular acceleration, however, the centroid does not generally coincide with the star position at the center of the integration time. The present invention mitigates the effect of such angular acceleration by determining an angular acceleration of the star tracker and modifying the star tracker data according to the determined angular acceleration. In one embodiment, an angular acceleration threshold is used to determine whether star tracker data should be used or discarded (e.g., referring to FIG. 3, for example, determining whether the star tracker measurement should be used to update the attitude quaternion correction of block 48). This technique mitigates the acceleration-induced errors by preventing the introduction of such errors in the spacecraft attitude estimates during periods when the spacecraft is experiencing high levels of angular acceleration. In a second embodiment, the determined angular acceleration is used to correct the H and V (horizontal and vertical) measurements reported by the star tracker. This compensates for the errors that the spacecraft acceleration introduces into the H and V measurements. As described below, the angular acceleration of the star tracker can be determined from predicted H and V values that are otherwise used to task the star tracker and/or the actual H and V values that the star tracker measures. This technique maintains the star tracker acceleration terms in the star tracker frame and simplifies the implementation of the correction. Further, this technique is applicable to a wide variety of optical sensors, including infrared (IR) sensors, UV, and visible sensors.

Figure 5:
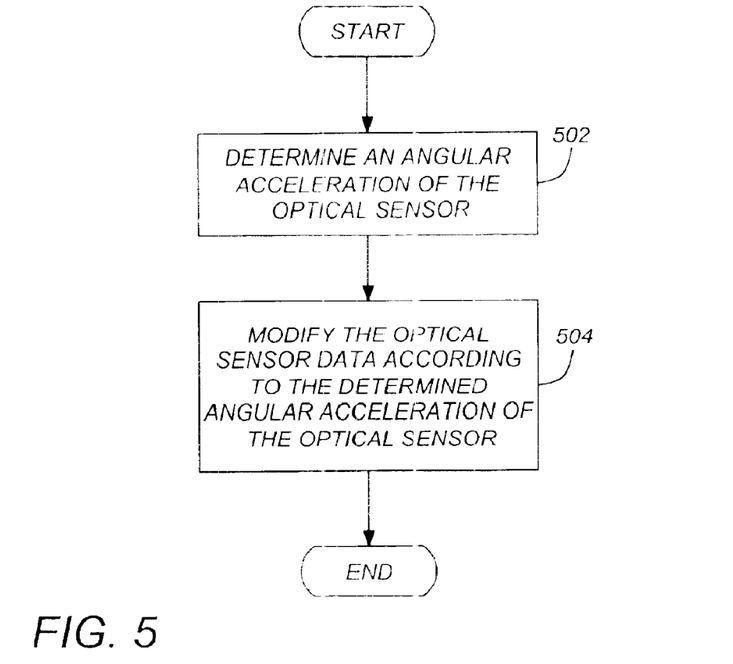
FIG. 5 is a flow chart presenting exemplary processes that can be used to practice one embodiment of the invention.

FIG. 5 is a flow chart presenting exemplary processes that can be used to practice one embodiment of the invention. In block 502, an angular acceleration of an optical sensor is determined. In typical spacecraft applications, the optical sensor is a star tracker that is fixedly mounted to the spacecraft bus. Consequently, the angular acceleration of the star tracker is substantially the same as the angular acceleration of the spacecraft (or differing by a coordinate transformation). In other applications, the optical sensor may be gimballed and hence, the angular acceleration of the sensor maybe different than that of the missile body to which it is attached. In this case, the angular acceleration of the optical sensor can be determined from a combination of vehicle accelerations and the angular position, angular velocity or angular acceleration of the gimbal.

In block 504, the optical sensor data is modified according to the determined angular acceleration of the optical sensor.

Figure 6:
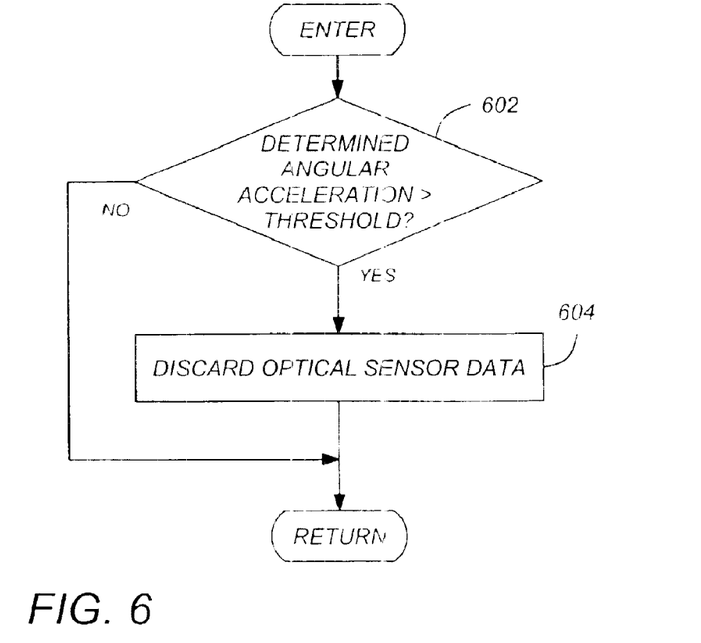
FIG. 6 is a flow chart illustrating an embodiment in which the optical sensor data is modified by simply discarding, disregarding, or setting the optical sensor data to zero according to a comparison between the determined angular acceleration and a threshold.

FIG. 6 is a flow chart illustrating an embodiment of the present invention in which the optical sensor data is modified by simply discarding or disregarding the data from the optical sensor according to a comparison between the determined angular acceleration and a threshold. In the illustrated embodiment, block 602 determines whether the determined angular acceleration exceeds a threshold, and block 604 discards or disregards the star tracker data if the acceleration threshold is exceeded. If the angular acceleration threshold is not exceeded, processing bypasses block 604. In such case, the information from the optical sensor is provided to the SCP 36.

Figure 7:
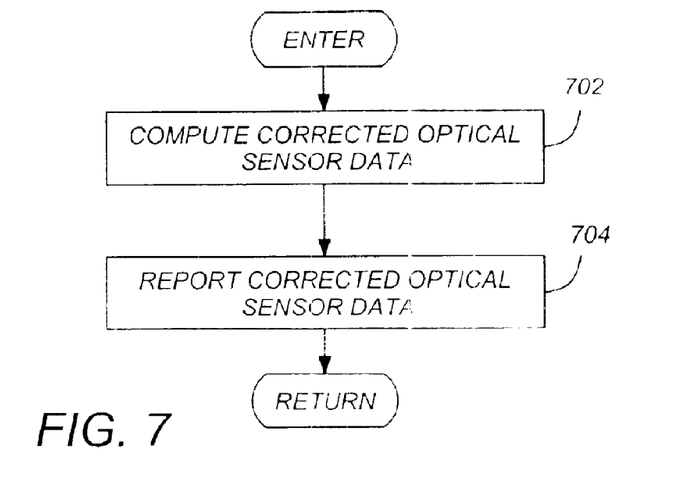
FIG. 7 is a flow chart illustrating an embodiment in which the optical sensor data is modified to compensate for the acceleration of the optical sensor.

FIG. 7 is a flow chart illustrating an embodiment of the present invention in which the optical sensor data is modified to compensate for the acceleration of the optical sensor. In block 702, a corrected optical sensor data is computed at least in part from the angular acceleration determined in block 502. Tis corrected optical sensor data is then reported to the SCP 36 or other satellite processors and/or subsystems, as shown in block 704.

An exemplary embodiment in which data correction is applied to a sensor having orthogonal horizontal and vertical measurement components (including star trackers) is now described. It is noted that errors in star tracker measurements H and V can be determined from $$\frac{d^2 H}{dt^2} \text{ and } \frac{d^2 V}{dt^2}.$$

Given that the star tracker produces a measurement by integrating optical input over an integration interval of length T, and using M to represent either H or V, as appropriate, we can (without loss of generality) choose the time origin t=0 as the center of the integration time, and approximate M as a cubic polynomial with $$\frac{d^3 U}{dt}$$

constant:

$$M(t) = M_0 + \frac{dM_0}{dt}t + \frac{d^2 M_0}{dt^2}\frac{t^2}{2} + \frac{d^3 M}{dt^3}\frac{t^3}{6}$$

The output value of the star tracker tagged data for t=0 is:

$$M_{avg} = \frac{1}{T}\int_{-\frac{T}{2}}^{\frac{T}{2}} M(t)\,dt = M_0 + \frac{d^2 M_0}{dt^2}\frac{T^2}{24} \quad \text{EQ. (4)}$$

Note that no odd-power terms of M(t) affect $M_{avg}$, since they integrate to zero over the interval from −T/2 to T/2 due to their antisymmetry about t=0.

The actual value of M(t) at t=0 is $$M(0) = M_0 \quad \text{EQ. (5)}$$

So, corrected values for H and V at the center of the integration interval T can be expressed as:

$$H_{corr} = H_{avg} - \frac{d^2 H_0}{dt^2}\frac{T^2}{24} \quad \text{EQ. (6A)}$$

$$V_{corr} = V_{avg} - \frac{d^2 V_0}{dt^2}\frac{T^2}{24} \quad \text{EQ. (6B)}$$

As illustrated in FIGS. 3 and 4, the star trackers data typically includes a time tag associated with each measurement of H and V. One alternative to compensate for the acceleration induced error is to compute the actual time-tag that truly represents the star positions reported by the star tracker. In other words, the corrected star tracker data comprises a corrected time tag instead of a corrected measurement value. Corrected time-tags $t_h$ and $t_v$ can be determined such that star positions associated with these time-tags, $t_h$ and $t_v$, are matched with the star tracker reported (centroided) positions.

If we neglect the cubic term, and equate reported H and V values to the polynomial, we obtain:

$$H_{avg} = H_0 + \alpha_{h0}\frac{T^2}{24} = H_0 + \omega_{h0}t + \frac{\alpha_{h0}}{2}t^2 \quad \text{EQ. (7A)}$$

$$V_{avg} = V_0 + \alpha_{v0}\frac{T^2}{24} = V_0 + \omega_{v0}t + \frac{\alpha_{v0}}{2}t^2 \quad \text{EQ. (7B)}$$

where $$\omega_{h0} = \frac{dH_0}{dt}; \quad \omega_{v0} = \frac{dV_0}{dt}; \quad \text{EQ. (8A, 8B, 8C, and 8D)}$$

$$\alpha_{h0} = \frac{d^2 H_0}{dt^2}; \quad \alpha_{v0} = \frac{d^2 V_0}{dt^2}$$

The solutions for the correction time-tags, $t_h$ and $t_v$, can be obtained by solving two quadratic equations described in equations 7A and 7B. The results are:

$$t_h = -\frac{\omega_{h0}}{\alpha_{h0}} \pm \sqrt{\left(\frac{\omega_{h0}}{\alpha_{h0}}\right)^2 + \frac{T^2}{12}}; \quad \text{EQs. (9A and 9B)}$$

for $\alpha_{h0} \neq 0$;  $t_h = 0$; for $\alpha_{h0} = 0$ $$t_v = -\frac{\omega_{v0}}{\alpha_{v0}} \pm \sqrt{\left(\frac{\omega_{v0}}{\alpha_{v0}}\right)^2 + \frac{T^2}{12}};$$

for $\alpha_{v0} \neq 0$;  $t_v = 0$; for $\alpha_{v0} = 0$

One special case when both $\omega_{h0}$ and $\omega_{v0}$ are both equal to zero (indicating that at the center of the CCD integration the CCD boresight was at rest). In this case, if neither $\alpha_{h0}$ or $\alpha_{v0}$ were zero:

$$t_h = t_v = \pm \frac{T}{\sqrt{12}} \quad \text{EQ. (10)}$$

Block 502 of FIG. 5 illustrates the process of determining the angular acceleration of the optical sensor. This can be accomplished in a number of different ways.

Figure 8:
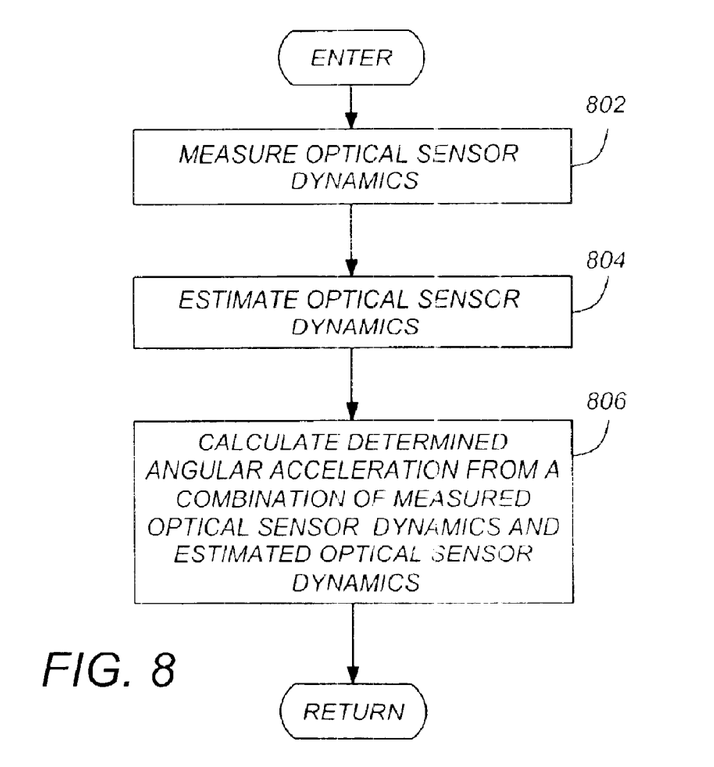
FIG. 8 is a flow chart illustrating the determination of the angular acceleration of the optical sensor.

FIG. 8 is a flow chart illustrating the determination of the angular acceleration of the optical sensor from a combination of measured and estimated optical sensor dynamics (e.g. angular acceleration). Optical sensor dynamics are measured and estimated as shown in blocks 802 and 804. Then, the measured and estimated optical sensor dynamics are combined, to determine the angular acceleration of the optical sensor, as shown in block 806.

Measured optical sensor dynamics can be obtained from optical sensor measurements themselves, or from inertial sensors on the spacecraft, with application of suitable coordinate transformations, or a combination of both. Estimated optical sensor dynamics, as discussed below, can be obtained from the application of torque commands to a dynamic model of the spacecraft.

In one embodiment, the acceleration of the star tracker is determined from star tracker H and V measurements. Although the H and V measurements provide the angular position of the star tracker as a function of time, this data can be used to determine higher order angular dynamics, namely, the angular velocity and angular acceleration of the star tracker.

Three or more H and V measurements may be curve-fitted to a second order polynomial, and the resulting polynomial is used to determine the angular acceleration of the star tracker. Typically, the three H and V measurements are sequential and equally spaced in time, but this need not be the case. Of course, optimal estimators, which consider other parameters such as sensor noise and the like, can be used to improve the angular acceleration estimate.

The average acceleration may also be determined by simple computations performed on the H and V measurements. For example, if the H and V measurements are sequential and evenly spaced in time, three such measurements $M(t_0)$, $M(t_1)$, $M(t_2)$ can be used to compute an average angular acceleration at the centroid time $t_1$ by computing $$M_{2-1} = \frac{M(t_2) - M(t_1)}{(t_2 - t_1)} \text{ and}$$

$$M_{1-0} = \frac{M(t_1) - M(t_0)}{(t_1 - t_0)},$$

wherein $M(t_2)$, $M(t_1)$, $M(t_0)$ are optical sensor measurements at time $t_2$, $t_1$, and $t_0$, respectively, and computing the angular acceleration as $$\frac{2(M_{2-1} - M_{1-0})}{(t_2 - t_0)}.$$

This technique is not only computationally efficient and easy to implement, it also effectively negates the effect of higher order angular dynamic terms on the results obtained. This can be more readily appreciated by expressing the angular dynamics as a Taylor expansion. If the dynamics are integrated symmetrically (from the centroid of the time interval, as is the case in the above example), all odd powered terms (e.g. $t^1$, $t^3$, $t^5$, . . . ) cancel out and the constant terms are recovered. This is because for odd powers, $f(t) = -f(-t)$ about the centroid of the interval of interest.

The angular acceleration of the optical sensor may also be determined from measurements from inertial sensors. For example, the output of the gyro triad rate sensors 30 can be used to derive angular acceleration, or a sensor that directly measures angular acceleration can be used.

The angular acceleration of the star tracker may also be determined from optical sensor dynamics (e.g. the angular acceleration of the optical sensor) that were estimated or predicted from spacecraft torque commands. In typical spacecraft applications, the attitude of the spacecraft (illustrated as the output in FIG. 3), as well as other information regarding the dynamic state of the spacecraft, is provided to a spacecraft navigation and control system, which ultimately commands torquers, reaction wheels, and/ or thrusters to apply torque to the spacecraft so that it is placed in the desired dynamic state for operational purposes. Since the torque commands are known (they are provided by the SCP 36), and an approximate dynamic model of the spacecraft is known, the spacecraft angular acceleration can be estimated by application of the commanded torque to the dynamic model. For example, in a simple case, given a particular moment of inertia I about a spacecraft axis and a command T to torque the spacecraft about that axis, the angular acceleration $\alpha$ of the spacecraft can be approximated as $$\frac{T}{I}.$$

Using more complex torque commands and a detailed spacecraft dynamic model, an estimate of the angular acceleration of the spacecraft (and hence, the optical sensor) can be derived.

Finally, the angular acceleration of the optical sensor or star tracker can be determined by combining results obtained by any combination of the foregoing techniques. For example an estimate of the angular acceleration from sensor data can be combined with an estimate obtained by applying spacecraft torque commands to the spacecraft dynamic model. Each estimate can be weighted as desired. For example if the acceleration estimates from the inertial sensor measurements, and dynamic model are denoted $\alpha_{inertial\_sensor}$, $\alpha_{dynamic}$, the final estimate of the optical sensor angular acceleration can be expressed as $\lambda \alpha_{inertial\_sensor} + (1-\lambda)\alpha_{dynamic}$ wherein $\lambda$ is a weighting factor between zero and one. Angular acceleration estimates from star tracker measurements can be similarly combined with estimates from other sources to arrive at a final angular acceleration estimate.

Similar techniques can be used to derive angular velocity estimates, and the angular velocity and acceleration estimates can be stored in the circular buffer 50 shown in FIGS. 2 and 3. Such estimates can be retrieved, interpolated if necessary, and used to determine or assist in the determination of the optical sensor angular acceleration. Since such estimates can also be used for star tracker tasking and time matching.

As described above, measurements from the inertial sensors or those which are predicted from torque commands to the spacecraft model are typically provided at much higher update rates than the data from star trackers and similar devices. Even so, the time centroid (time tag) associated with the measurement from the star tracker will not generally precisely match the time tag associated with the data from the angular rate or acceleration sensors.

Figure 9:
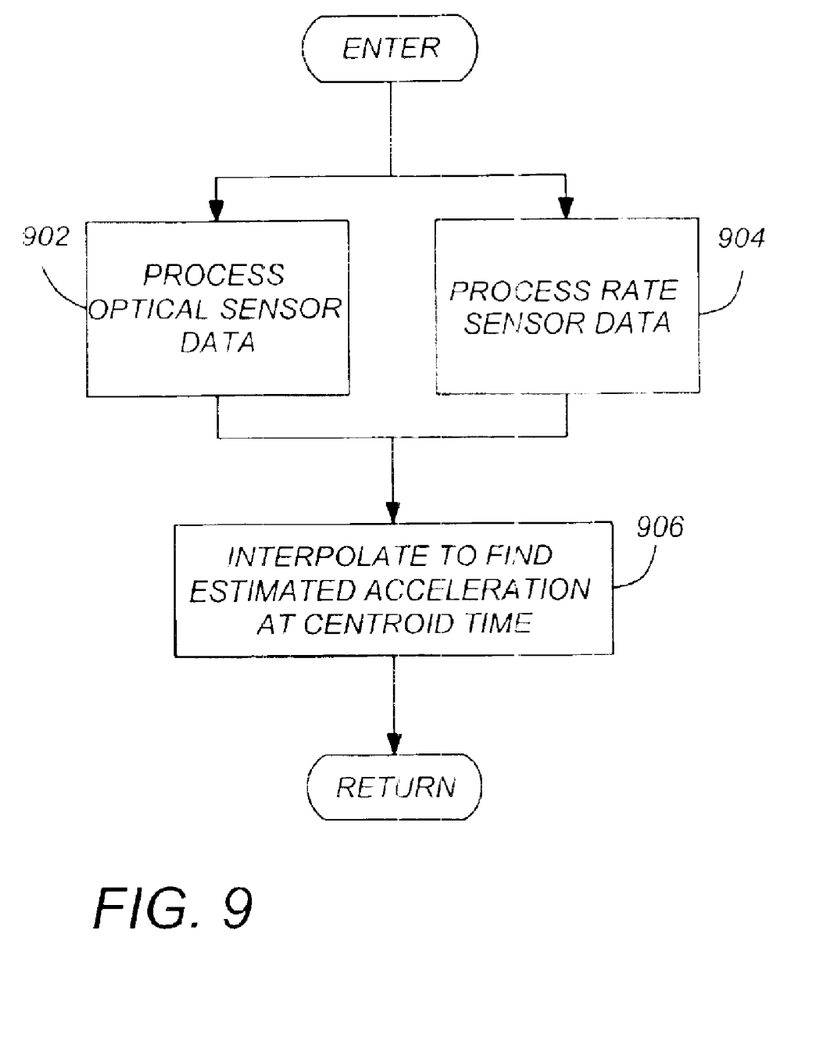
FIG. 9 is a flow chart illustrating one embodiment of how the optical sensor angular acceleration measurements can be combined with the angular acceleration measurements from the inertial sensors.

FIG. 9 is a flow chart illustrating one embodiment of how the optical sensor measurements of the optical sensor angular acceleration can be combined with angular acceleration measurements obtained from inertial sensors, even when each of these measurements are taken at different rates. In this embodiment, data from the optical sensor (typically separated by much more than 33 milliseconds and also associated with a time-tag) and the inertial sensor (typically separated by 33 milliseconds) is processed and stored in a memory such as the circular buffer 50 with time tags associated with each measurement. This is shown in blocks 902 and 904. The inertial sensor data is interpolated to determine the angular acceleration at the centroid time (as expressed by the time-tag) of the optical sensor measurement, as shown in block 906.

Finally, even with the computation of acceleration-corrected optical sensor data, it can be useful to discard or disregard optical sensor data taken when the angular acceleration of the optical sensor exceeds a threshold. For example, star trackers generally include an angular velocity limit determined largely by the field of view. When the angular acceleration of the star tracker is high, simply checking the velocity at the time tag point may not be enough to ensure that the data has not been corrupted (for example, by exceeding the velocity limit so that the "sweep" of the star leaves the star tracker's field of view during the integration time).

CONCLUSION

This concludes the description of the preferred embodiments of the present invention. In summary, the present invention discloses a method, apparatus, article of manufacture, and a memory structure for compensating for optical sensor data corrupted by angular acceleration. The method comprises the steps of determining an angular acceleration of the optical sensor and modifying the optical sensor data according to the determined angular acceleration of the optical sensor. The apparatus comprises a sensor for determining an angular acceleration of the optical sensor and a navigation system for modifying the optical sensor data according to the determined angular acceleration of the optical sensor.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing has been described with respect to a star tracker, the foregoing techniques can be used to correct for angular acceleration effects on any sensor with similar limitations (e.g. the collection of data over a significant time interval, during which the measurement data can be compromised), such as a missile seeker, earth limb sensor, or sun sensor. It is therefore intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of compensating for star tracker data corrupted by angular acceleration, comprising the steps of:

determining an angular acceleration of the star tracker, and modifying the star tacker data according to the determined angular acceleration of the star tracker.

2. The method of claim 1, wherein the step of modifying the star tracker data according to the determined angular acceleration of the star tracker comprises the step of:

selectively discarding or retaining the star tracker data according to a comparison of the determined angular acceleration of the star tracker with a threshold.

3. The method of claim 2, wherein the step of selectively discarding or retaining the star tracker data according to the comparison of the determined angular acceleration of the star tracker with the threshold comprises the steps of:

discarding the star tracker data if the determined angular acceleration of the star tracker is more than the threshold; and retaining the star tacker data if the determined angular acceleration of the star tracker is less than or equal to the threshold.

4. The method of claim 1, wherein the step of modifying the star tracker data according to the determined acceleration of the star tracker comprises the step of:

selectively discarding or retaining the star tracker data according to a comparison of a difference between the modified optical sensor measurement and the unmodified optical sensor measurement with a threshold.

5. The method of claim 4, wherein the step of selectively discarding or retaining the star tracker data according to te comparison of the difference between the modified star tracker data and the unmodified star tracker data with a threshold comprises the steps of:

discarding the star tracker data if the difference between the modified star tracker data and the unmodified star tracker data is more than the threshold; and retaining the star tracker data if the difference between the star tracker data and the unmodified star tracker data is less than or equal to the threshold.

6. The method of claim 1, wherein the step of modifying the star tracker data according to the determined acceleration of the star tracker comprises the steps of:

computing corrected star tracker data; and reporting the corrected star tracker data.

7. The method of claim 6, wherein:

the star tracker data comprises a star tracker measurement $M_{avg}$ taken over an interval T and corresponding to a time at a center of the interval;

the step of computing corrected star tracker data comprises the step of computing a corrected star tracker measurement $$M_{corr} = M_{avg} - \frac{d^2 M_0}{dt^2} \frac{T^2}{24},$$

wherein $$\frac{d^2 M_0}{dt^2}$$

is the determined angular acceleration of the star tracker at the center of the interval T.

8. The method of claim 7, further comprising the steps of:

discarding the star tracker data taken when the determined angular acceleration of the star tracker is more than the threshold; and retaining the star tracker data taken when the determined angular acceleration of the star tracker is less than or equal to the threshold.

9. The method of claim 6, wherein the step of determining the angular acceleration of the star tracker comprises the step of:

determining the angular acceleration of the star tracker from a combination of measured star tracker dynamics and estimated star tracker dynamics.

10. The method of claim 9, wherein the measured star tracker dynamics are determined from a gyro and the estimated star tracker dynamics are determined from a satellite torque command applied to a satellite dynamic model.

11. The method of claim 6, wherein the step of determining the angular acceleration of the star tracker comprises the step of:

determining the angular acceleration of the star tracker from a plurality of star tracker measurements.

12. The method of claim 11, wherein the step of determining the angular acceleration of the star tracker from a plurality of star tracker measurements comprises the step of:

interpolating between at least three star tracker measurements.

13. The method of claim 11, wherein the step of determining the angular acceleration of the star tracker from a plurality of star tracker measurements, comprises the steps of:

computing $$M_{2-1} = \frac{M(t_2) - M(t_1)}{(t_2 - t_1)} \text{ and } M_{1-0} = \frac{M(t_1) - M(t_0)}{(t_1 - t_0)},$$

wherein $M(t_2)$, $M(t_1)$, $M(t_0)$ are star tracker measurements at time $t_2$, $t_1$, and $t_0$, respectively; and computing the angular acceleration as $$\frac{2(M_{2-1} - M_{1-0})}{(t_2 - t_0)}.$$

14. The method of claim 6, wherein:

the star tracker data comprises a star tracker measurement M taken over an optical sensor integration period T; and the step of computing a corrected star tracker measurement comprises the step of computing a corrected time tag $t_{corr}$ for the star tracker measurement M.

15. The method of claim 14, further comprising the steps of:
discarding the star tracker measurement taken when the determined angular acceleration of the star tracker is more than the threshold; and
retaining the star tracker measurement taken when the determined angular acceleration of the star tracker is less than or equal to the threshold.

16. The method of claim 14, wherein the step of computing a corrected time tag $t_{corr}$ for the star tracker measurement M comprises the steps of:

$$\text{computing } t_{corr} = -\frac{\omega_0}{\alpha_0} \pm \sqrt{\left(\frac{\omega_0}{\alpha_0}\right)^2 + \frac{T^2}{12}} \text{ for } \alpha_0 \neq 0;$$

computing $t_{corr}=0$ for $\alpha_0=0$; and
wherein T is the star tracker integration period, $t_{corr}$ is a measurement time tag relative to the center of the integration period, $\omega_0$ is a star tracker measured velocity at a center of the integration period, and $\alpha_0$ is the determined angular acceleration of the star tracker.

17. An apparatus for compensating for star tracker data corrupted by angular acceleration, comprising:
means for determining an angular acceleration of the star tracker; and
means for modifying the star tracker data according to the determined angular acceleration of the star tracker.

18. The apparatus of claim 17, wherein the means for modifying the optical sensor data according to the determined angular acceleration of the star tracker comprises:
means for selectively discarding or retaining the star tracker data according to a comparison of the determined angular acceleration of the star tracker with a threshold.

19. The apparatus of claim 18, wherein the means for selectively discarding or retaining the star tracker data according to the comparison of the determined angular acceleration of the star tracker with the threshold comprises:
means for discarding the star tracker data if the determined angular acceleration of the star tracker is more than the threshold; and
means for retaining the star tracker data if the determined angular acceleration of the star tracker is less than or equal to the threshold.

20. The apparatus of claim 17, wherein the means for modifying the star tracker data according to the determined acceleration of the star tracker comprises:
means for selectively discarding or retaining the star tracker data according to a comparison of a difference between the modified star tracker measurement and the unmodified star tracker measurement with a threshold.

21. The apparatus of claim 20, wherein the means for selectively discarding or retaining the star tracker data according to the comparison of the difference between the modified star tracker data and the unmodified star tracker data with a threshold comprises:
means for discarding the star tracker data if the difference between the modified star tracker data and the unmodified star tracker data is more than the threshold; and
means for retaining the star tracker data if the difference between the modified star tracker data and the unmodified star tracker data is less than or equal to the threshold.

22. The apparatus of claim 17, wherein the means for modifying the star tracker data according to the measured acceleration of the star tracker comprises:
means for computing corrected star tracker data; and
means for reporting the corrected star tracker data.

23. The apparatus of claim 22, wherein:
the optical sensor data comprises a star tracker measurement $M_{avg}$ taken over an interval from T and corresponding to a time at a center of the interval;
the means for computing corrected star tracker data comprises means for computing a corrected star tracker measurement $$M_{corr} = M_{avg} - \frac{d^2 M_0}{dt^2}\frac{T^2}{24},$$

wherein $$\frac{d^2 M_0}{dt^2}$$

is the determined angular acceleration of the star tracker at the center of the interval T.

24. The apparatus of claim 23, further comprising:
means for discarding the star tracker data taken when the determined angular acceleration of the star tracker is more than the threshold; and
means for retaining the star tracker data taken when the determined angular acceleration of the star tracker is less than or equal to the threshold.

25. The apparatus of claim 22, wherein the means for determining the angular acceleration of the star tracker comprises:
means for determining the angular acceleration of the star tracker from a combination of measured star tracker dynamics and estimated star tracker dynamics.

26. The apparatus of claim 25, wherein the measured star tracker dynamics are determined from a gyro and the estimated star tracker dynamics are determined from a satellite torque command applied to a satellite dynamic model.

27. The apparatus of claim 22, wherein the means for determining the angular acceleration of the star tracker comprises:
means for determining the angular acceleration of the star tracker from a plurality of star tracker measurements.

28. The apparatus of claim 27, wherein the means for determining the angular acceleration of the star tracker from a plurality of star tracker measurements, comprises:
means for interpolating between at least three star tracker measurements.

29. The apparatus of claim 27, wherein the means for determining the angular acceleration of the star tracker from a plurality of star tracker measurements, comprises:
means for computing $$M_{2-1} = \frac{M(t_2) - M(t_1)}{(t_2 - t_1)} \text{ and } M_{1-0} = \frac{M(t_1) - M(t_0)}{(t_1 - t_0)},$$

wherein $M(t_2), M(t_1), M(t_0)$ are star tracker measurements at time $t_2, t_1,$ and $t_0$, respectively, and means for computing the angular acceleration as $$\frac{2(M_{2-1} - M_{1-0})}{(t_2 - t_0)}.$$

30. The apparatus of claim 22, wherein:

the star tracker data comprises a star tracker measurement M taken over a star tracker integration period T; and the means for computing a corrected star tracker measurement comprises means for computing a corrected time tag $t_{corr}$ for the star tracker measurement M.

31. The apparatus of claim 30, further comprising:

means for discarding the star tracker measurement taken when the determined angular acceleration of the star tracker is more than the threshold; and means for retaining the star tracker measurement taken when the determined angular acceleration of the star tracker is less than or equal to the threshold.

32. The apparatus of claim 30, wherein the means for computing a corrected time tag $t_{corr}$ for the star tracker measurement M comprises:

means for computing $$t_{corr} = -\frac{\omega_0}{\alpha_0} \pm \sqrt{\left(\frac{\omega_0}{\alpha}\right)^2 + \frac{T^2}{12}} \text{ for } \alpha_0 \neq 0;$$

means for computing $t_{corr}=0$ for $\alpha_0=0$; and wherein T is the star tracker integration period, $t_{corr}$ is a measurement time tag relative to the center of the integration period, $\omega_0$ is a star tracker measured velocity at a center of the integration period, and $\alpha_0$ is the determined angular acceleration of the star tracker.

33. An apparatus for compensating for star tracker data corrupted by angular acceleration, comprising:

a sensor for determining an angular acceleration of the star tracker; and a navigation system for modifying the star tracker data according to the determined angular acceleration of the star tracker.

34. The apparatus of claim 33, wherein the navigation system selectively discards or retains the star tracker data according to a comparison of the determined angular acceleration of the star tracker with a threshold.

35. The apparatus of claim 34, wherein the navigation system discards the star tracker data if the determined angular acceleration of the star tracker is more than the threshold, and retains the star tracker data if the angular acceleration of the star tracker is less than or equal to the threshold.

36. The apparatus of claim 33, wherein the navigation system selectively discards or retains the star tracker data according to a comparison of a difference between the modified star tracker measurement and the unmodified star tracker measurement with a threshold.

37. The apparatus of claim 36, wherein navigation system discards the star tracker data if the difference between the modified star tracker data and the unmodified star tracker data is more than the threshold, and retains the star tracker data if the difference between the modified star tracker data and the unmodified star tracker data is less than or equal to the threshold.

38. The apparatus of claim 33, wherein the navigation system computes and reports corrected star tracker data.

39. The apparatus of claim 38, wherein:

the star tracker data comprises a star tracker measurement $M_{avg}$ taken over an interval from T and corresponding to a time at a center of the interval;

the navigation system computes a corrected star tracker data comprises means for computing a corrected star tracker measurement $$M_{corr} = M_{avg} - \frac{d^2 M_0}{dt^2} \frac{T^2}{24},$$

wherein $$\frac{d^2 M_0}{dt^2}$$

is the determined angular acceleration of the star tracker at the center of the interval T.

40. The apparatus of claim 39, wherein:

the navigation system discards the star tracker data taken when the angular acceleration of the star tracker is more than the threshold, and retains the star tracker data taken when the angular acceleration of the star tracker is greater than or equal to the threshold.

41. The apparatus of claim 38, wherein the navigation system determines the angular acceleration of the star tracker from a combination of measured star tracker dynamics and estimated star tracker dynamics.

42. The apparatus of claim 41, wherein the measured star tracker dynamics are determined from a gyro and the estimated star tracker dynamics are determined from a satellite torque commands applied to a satellite dynamic model.

43. The apparatus of claim 38, wherein the navigation system determines the angular acceleration of the star tracker from a plurality of star tracker measurements.

44. The apparatus of claim 43, wherein the navigation system interpolates between at least three star tracker measurements.

45. The apparatus of claim 43, wherein the navigation system computes $$M_{2-1} = \frac{M(t_2) - M(t_1)}{(t_2 - t_1)} \text{ and } M_{1-0} = \frac{M(t_1) - M(t_0)}{(t_1 - t_0)},$$

wherein $M(t_2)$, $M(t_1)$, $M(t_0)$ are star tracker measurements at time $t_1$, $t_1$, and $t_3$, respectively, and computes the angular acceleration as $$\frac{(t_2 - t_0)(M_{2-1} - M_{1-0})}{(t_2 - t_1) - (t_1 - t_0)}.$$

46. The apparatus of claim 38, wherein:

the star tracker data comprises a star tracker measurement M taken over an interval T; and the navigation system computes a corrected time tag $t_{corr}$ for the star tracker measurement M.

47. The apparatus of claim 46, wherein the navigation system further discards the star tracker measurement taken when the determined angular acceleration of the star tracker is more than the threshold, and retains the star tracker measurement taken when the determined angular acceleration of the star tracker is less than or equal to the threshold.

48. The apparatus of claim 46, wherein the navigation system computes $$t_{corr} = -\frac{\omega_0}{\alpha_0} \pm \sqrt{\left(\frac{\omega_0}{\alpha_0}\right)^2 + \frac{T^2}{12}} \text{ for } \alpha_0 \neq 0,$$

computes $t_{corr} = 0$ for $\alpha_0 = 0$, wherein T is the star tracker integration period, $t_{corr}$ is a measurement time tag relative to the center of the integration period, $\omega_0$ is a star tracker measured velocity at a center of the integration period, and $\alpha_0$ is the determined angular acceleration of the star tracker.

* * * * *